US012064957B2

(12) United States Patent
Sugiura et al.

(10) Patent No.: US 12,064,957 B2
(45) Date of Patent: Aug. 20, 2024

(54) IMAGE RECORDING APPARATUS

(71) Applicant: BROTHER KOGYO KABUSHIKI KAISHA, Nagoya (JP)

(72) Inventors: Akihito Sugiura, Aichi-ken (JP); Masayuki Okumura, Nagoya (JP); Shigeki Kato, Toyoake (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 756 days.

(21) Appl. No.: 17/120,917

(22) Filed: Dec. 14, 2020

(65) Prior Publication Data

US 2021/0178783 A1 Jun. 17, 2021

(30) Foreign Application Priority Data

Dec. 16, 2019 (JP) ................................ 2019-226106

(51) Int. Cl.
*B41J 11/00* (2006.01)
*B41J 13/08* (2006.01)

(52) U.S. Cl.
CPC ........... *B41J 11/0085* (2013.01); *B41J 13/08* (2013.01)

(58) Field of Classification Search
CPC ........ B41J 11/0085; B41J 13/08; B65H 5/026
See application file for complete search history.

(56) References Cited

U.S. PATENT DOCUMENTS 6,736,501 B2 * 5/2004 Yamaguchi .............. B41J 11/06 347/104
7,040,825 B2 * 5/2006 Asada .................. B41J 11/0085 400/648
8,109,627 B2 * 2/2012 Arai ....................... B41J 11/007 347/104
2004/0245700 A1 12/2004 Asada et al.
(Continued)

FOREIGN PATENT DOCUMENTS

EP 2505532 A2 10/2012
JP H09-220837 A 8/1997
(Continued)

OTHER PUBLICATIONS

Notice of Reasons for Refusal dated Oct. 3, 2023 received in Japanese Patent Application No. JP 2019-226106.

*Primary Examiner* — Howard J Sanders
(74) *Attorney, Agent, or Firm* — Scully, Scott, Murphy & Presser, P.C.

(57) ABSTRACT

There is provided an image recording apparatus including: an endless belt which extends in a conveying direction and which has a conveying surface configured to convey a medium; a driver configured to rotate the endless belt along the conveying direction; a support which is aligned with the endless belt in an orthogonal direction being parallel to the conveying surface and orthogonal to the conveying direction, the support having a pair of support walls extending in the conveying direction, and arranged at an interval in the orthogonal direction so as to define between each other a space opened in an orientation in which the conveying
(Continued)

surface faces; an air flow generator configured to generate an air flow allowed to flow along the conveying direction in the space between the support walls; and a recorder configured to record an image on the medium supported by the endless belt and the support.

18 Claims, 7 Drawing Sheets

(56) References Cited

U.S. PATENT DOCUMENTS

| | | | |
|---|---|---|---|
| 2009/0251521 | A1 | 10/2009 | Arai |
| 2011/0293346 | A1 | 12/2011 | Sato |

FOREIGN PATENT DOCUMENTS

| | | | |
|---|---|---|---|
| JP | 2003-104600 | A | 4/2003 |
| JP | 2004-291544 | A | 10/2004 |
| JP | 2009083250 | A | 4/2009 |
| JP | 2009-179462 | A | 8/2009 |
| JP | 2010023988 | A | 2/2010 |
| JP | 2011245793 | A | 12/2011 |
| JP | 2015-003489 | A | 1/2015 |
| JP | 2021094762 | A | 6/2021 |

* cited by examiner

IMAGE RECORDING APPARATUS

CROSS REFERENCE TO RELATED APPLICATION

The present application claims priority from Japanese Patent Application No. 2019-226106 filed on Dec. 16, 2019, the disclosure of which is incorporated herein by reference in its entirety.

BACKGROUND

The present disclosure relates to an image recording apparatus provided with an endless belt for conveying a medium.

A certain image recording apparatus has an endless type suction belt and a suction mechanism with which a medium is conveyed to a position opposed to a recording head. A large number of through-holes are formed through the suction belt over its whole circumference. The suction mechanism sucks the air by the aid of the through-holes of the suction belt positioned on a conveying surface opposed to the recording head. Accordingly, the medium is sucked to the suction belt. Further, the image recording apparatus has a printing stage which is formed with suction holes and which is positioned on both sides of the suction belt. When a sheet, which has a width wider than that of the suction belt, is conveyed, the sheet is sucked to the printing stage (see, for example, Japanese Patent Application Laid-open No. 2003-104600).

SUMMARY

When the suction belt is adopted, it is necessary to provide the suction mechanism in the space surrounded by the inner circumferential surface of the suction belt. Therefore, the image recording apparatus is consequently large-sized. In order to miniaturize the image recording apparatus, it is conceived to adopt a conveying belt which has no suction hole, in place of the suction belt. However, in this case, the printing stage and the sheet are brought in surface-to-surface contact with each other. The rotating conveying belt easily slips with respect to the sheet. On this account, it is necessary to take, for example, such a countermeasure that the conveying surface of the conveying belt is allowed to protrude from the upper surface of the printing stage. As a result, it is feared that the distance may be dispersed or varied between the nozzles of the recording head and the medium.

The present disclosure has been made taking the foregoing circumstances into consideration, an object of which is to provide an image recording apparatus which makes it possible to suppress the dispersion of the distance between a recording unit and a medium.

An image recording apparatus according to the present disclosure includes:

an endless belt which extends in a conveying direction and which has a conveying surface configured to convey a medium:

a driver configured to rotate the endless belt along the conveying direction;

a support which is aligned with the endless belt in an orthogonal direction being parallel to the conveying surface and orthogonal to the conveying direction, the support having a pair of support walls extending in the conveying direction, and arranged at an interval in the orthogonal direction so as to define between each other a space opened in an orientation in which the conveying surface faces;

an air flow generator configured to generate an air flow allowed to flow along the conveying direction in the space between the pair of support walls; and a recorder configured to record an image on the medium supported by the endless belt and the support.

BRIEF DESCRIPTION OF THE DRAWINGS

FIG. 1 schematically depicts an image recording apparatus 30, wherein

FIG. 1B is viewed from an upper position.

EMBODIMENTS

An explanation will be made below about an image recording apparatus 30 according to an embodiment of the present invention. Note that the embodiment explained below is merely an example of the present disclosure, and it goes without saying that the embodiment can be appropriately changed within a range without changing the gist or essential characteristics of the present invention. Further, in the following explanation, the advance, which is directed from the start point to the end point of the arrow, is expressed as “orientation”, and the displacement (coming and going) on a line to connect the start point and the end point of the arrow, is expressed as “direction”. Further, in the following explanation, the upward-downward direction 7 is defined on the basis of a state (state shown in FIG. 1A) in which the image recording apparatus 30 is usably installed. The front-back (front-rear) direction 8 is defined assuming that the side, on which a discharge port (outlet) 33 is provided, is designated as the front side (front surface). The left-right direction 9 is defined while the image recording apparatus 30 is viewed from the front side (front surface).

<Appearance Configuration of Image Recording Apparatus 30>

Figure 1A:
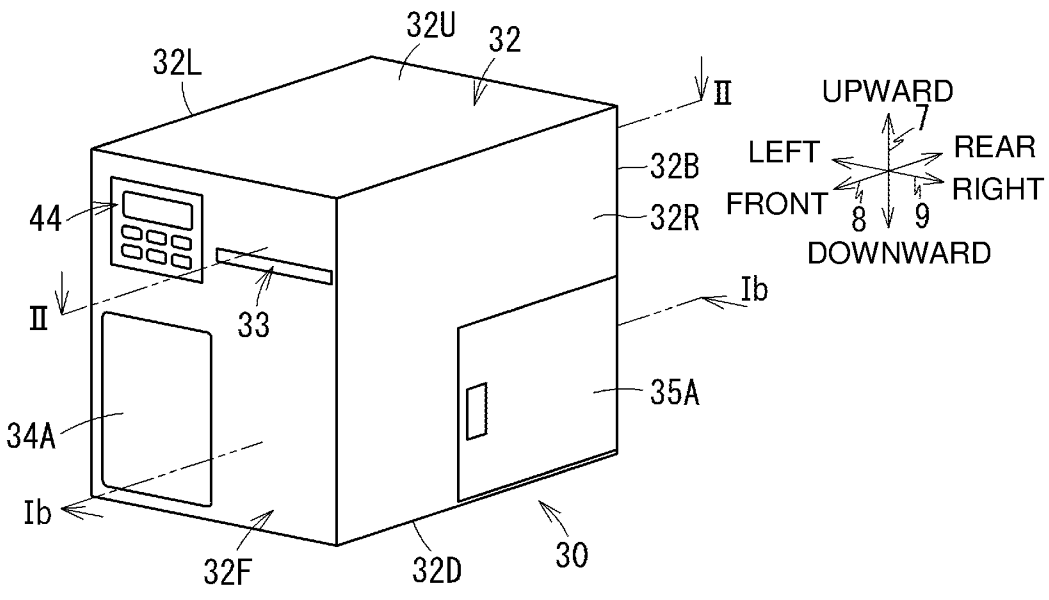
FIG. 1A depicts a perspective view schematically illustrating the appearance of the image recording apparatus 30.
Figure 1B:
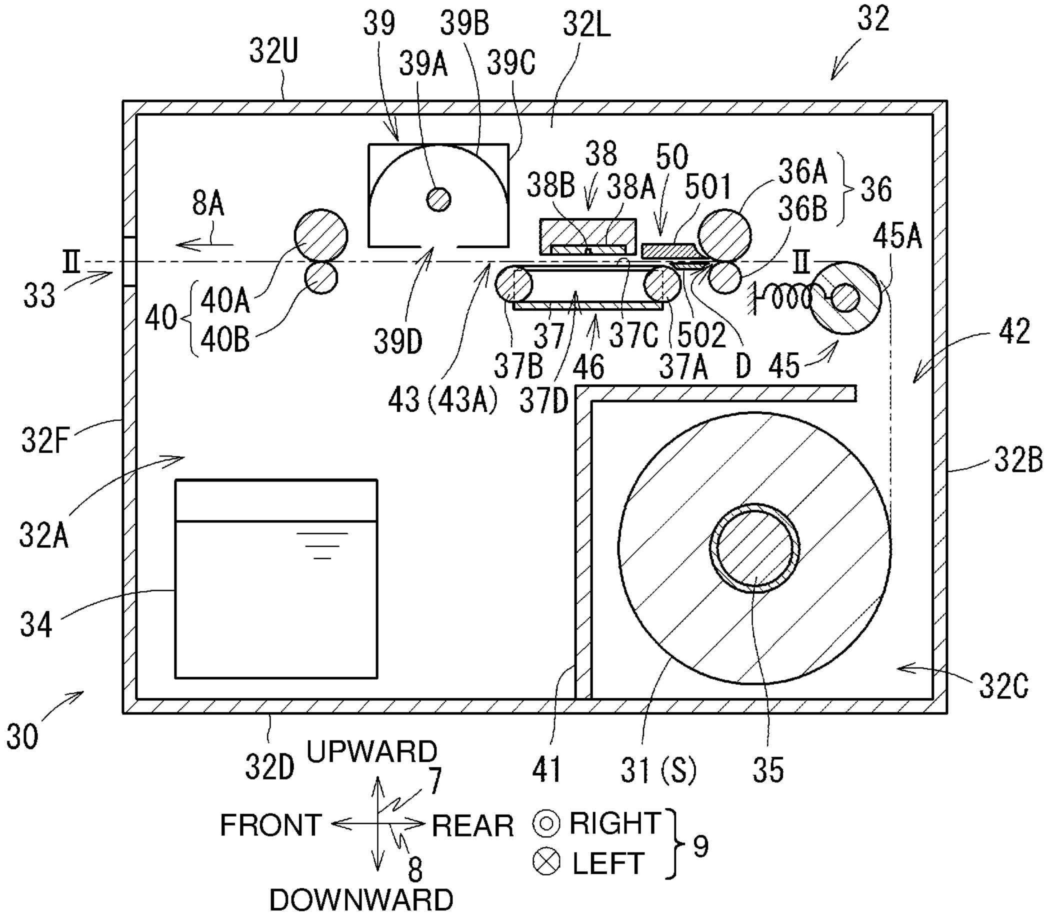
FIG. 1B depicts a sectional view in which a vertical cross section taken along a two-dot chain line Ib-Ib shown in FIG. 1A is viewed from a right position.

In the image recording apparatus 30 depicted in FIG. 1, an image is recorded in accordance with the ink-jet recording system on a sheet S which forms a roll member 31 (see FIG. 1B). The sheet S is an example of the medium. With reference to FIGS. 1A and 1B, a casing 32 of the image recording apparatus 30 generally has a rectangular parallelepiped shape, which has a size capable of being placed on a desk or table. That is, the image recording apparatus 30 is suitable for the use of being placed on a desk or table. Of course, the image recording apparatus 30 may be used while being placed on a floor surface or a rack.

The casing 32 has a right surface 32R and a left surface 32L, an upper surface 32U and a lower surface 32D, and a front surface 32F and a back surface 32B. Accordingly, an internal space 32A of the casing 32 (see FIG. 1B) is comparted from the outside. The right surface 32R and the left surface 32L are positioned while being separated from each other in the left-right direction 9. The upper surface 32U and the lower surface 32D are positioned while being separated from each other in the upward-downward direction 7, and they connect the right surface 32R and the left surface 32L. The front surface 32F and the back surface 32B are positioned while being separated from each other in the front-back direction 8, and they connect the upper surface 32U and the lower surface 32D.

As shown in FIG. 1A, a slit-shaped discharge port 33, which is long in the left-right direction 9, is positioned at an upper right portion of the front surface 32F. The sheet S (see FIG. 1B), on which the image has been recorded, is discharged from the discharge port 33.

Other than the above, an operation panel 44 and a front cover 34A may be provided on the front surface 32F. With the operation panel 44, a user performs the input in order that the image recording apparatus 30 is operated and/or various settings are decided. The front cover 34A is positioned at a lower portion of the front surface 32F. When the front cover 34A is opened/closed, a tank 34 (see FIG. 1B) or the like, which is positioned in the internal space 32A, is exposed or shielded.

<Internal Structure of Image Recording Apparatus 30>

As shown in FIG. 1B, a holder 35, a tensioner 45, a conveying roller pair 36, a guide unit 50, a conveying belt 37, a recording head 38, a support unit 46, a fixing unit 39, a conveying roller pair 40, and a tank 34 are arranged in the internal space 32A. Note that those arranged in the internal space of the casing 32 are, for example, a power source circuit and a maintenance unit including, for example, a cap for covering a nozzle surface of the recording head 38 and a wiper for wiping out the nozzle surface. However, the maintenance unit and the power source circuit are not principal parts of this embodiment. Therefore, they are omitted from the drawings, and any explanation thereof is avoided.

A partition wall 41 is provided in the internal space 32A. The partition wall 41 partitions the back lower portion of the internal space 32A to compart a sheet accommodating space 32C. The sheet accommodating space 32C is the space which is surrounded by the partition wall 41 and the casing 32 (specifically, the back surface 32B, the lower surface 32D, and the right surface 32R) and which is isolated, for example, from the recording head 38.

<Roll Member 31>

A roll member 31 is accommodated in the sheet accommodating space 32C. The roll member 31 has a core tube and the lengthy sheet S. The sheet S is wound around the core tube in a roll form in the circumferential direction of the axial center of the core tube. The sheet S has a sheet width A (see FIG. 2) in the widthwise direction extending along the axial center of the core tube. In this case, the sheet width A may have a value which is within a range ranging from a minimum sheet width A1 to a maximum sheet width A2 (see FIG. 2). The minimum sheet width A1 and the maximum sheet width A2 are the minimum width and the maximum width of the sheet S with which the image recording apparatus 30 can record the image. That is, a plurality of types of roll members 31, which have different sheet widths A, can be accommodated in the sheet accommodating space 32C. Note that it is also allowable that the roll member 31 does not have the core tube, and the sheet S is wound in a roll form so that the sheet S can be installed to the holder 35. Further, it is also allowable that fan-fold paper can be accommodated in the sheet accommodating space 32C.

<Holder 35>

As depicted in FIG. 1B, the holder 35, which extends in the left-right direction 9, is positioned in the sheet accommodating space 32C. One type of the roll member 31, which is selected from the plurality of types, can be installed to the holder 35. Upon the installation, the holder 35 supports the roll member 31 so that the axial center of the core tube of the roll member 31 extends in the left-right direction 9 and the roll member 31 is rotatable in the circumferential direction about the axial center. Further, the center of the sheet S in the widthwise direction is positioned at the center in the left-right direction 9 of the conveying passage 43 (hereinafter referred to as "passing paper center C" (see FIG. 2) as well). The holder 35 is rotated in accordance with the transmission of the rotation from an unillustrated motor. The roll member 31, which is supported by the holder 35, is also rotated in accordance with the rotation of the holder 35. Note that a right cover 35A (see FIG. 1A) is positioned on the right surface 32R of the casing 32. When the right cover 35A is opened/closed, for example, the holder 35, which is positioned in the sheet accommodating space 32C, is exposed or shielded.

As depicted in FIG. 1B, the sheet accommodating space 32C is open toward the upward at a back portion. In particular, a gap 42 is formed between the partition wall 41 and the back surface 32B, i.e., over or above the back end of the roll member 31. When the conveying roller pairs 36, 40 are rotated, then the sheet S is pulled out upwardly from the back end of the roll member 31, and the sheet S is guided to the tensioner 45.

<Tensioner 45>

Figure 2:
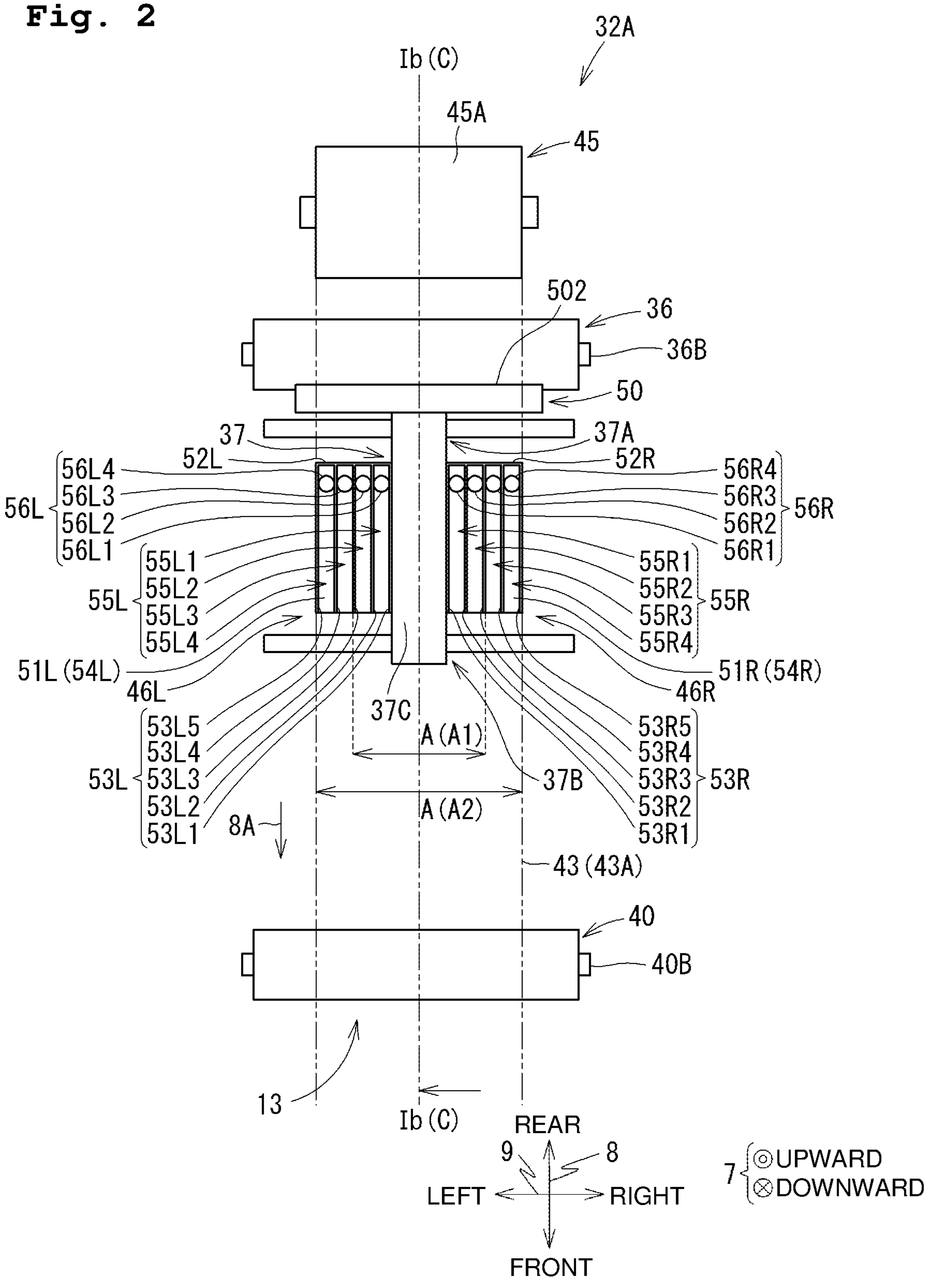
FIG. 2 depicts a sectional view in which a lateral cross section taken along a two-dot chain line l-II shown in FIG. 1A

The tensioner 45 is positioned over or above the partition wall 41 at the back portion of the internal space 32A. The tensioner 45 has an outer circumferential surface 45A which faces or is directed to the outside of the casing 32. Specifically, the outer circumferential surface 45A faces the upper surface 32U and the back surface 32B respectively. As depicted in FIG. 2, the outer circumferential surface 45A has a size which is not less than the maximum sheet width A2 in the left-right direction 9, and the outer circumferential surface 45A has a shape which is mutually symmetrical with respect to the passing paper center C. As depicted in FIG. 1B, the upper end of the outer circumferential surface 45A is disposed at the vertical position which is approximately the same as the vertical position of the nip D of the conveying roller pair 36 in the upward-downward direction 7.

The sheet S, which is pulled out from the roll member 31, is applied to the outer circumferential surface 45A, and the sheet S abuts against the outer circumferential surface 45A. The sheet S is curved frontwardly along the outer circumferential surface 45A to extend in the conveying orientation 8A, and the sheet S is guided by the conveying roller pair 36. The conveying orientation 8A is the frontward orientation extending in the front-back direction 8. The tensioner 45 gives the tension to the sheet S by means of any well-known technique.

Note that as for the tensioner 45, the present disclosure is not limited to the configuration depicted in FIG. 1B, i.e., the configuration in which the urging force, which is directed backwardly, is given to the roller by means of any urging member such as a spring or the like. It is also allowable to apply any other well-known technique.

<Conveying Roller Pairs 36, 40>

The conveying roller pair 36 is positioned in front of the tensioner 45. The conveying roller pair 36 has a conveying roller 36A and a pinch roller 36B. The conveying roller 36A and the pinch roller 36B mutually make abutment at approximately the same vertical position as that of the upper end of the outer circumferential surface 45A to form the nip D. The conveying roller pair 40 is positioned in front of the conveying roller pair 36. The conveying roller pair 40 has a conveying roller 40A and the pinch roller 40B. The conveying roller 40A and the pinch roller 40B mutually make abutment at approximately the same vertical position as that of the upper end of the outer circumferential surface 45A to form the nip. Each of the conveying rollers 36A, 40A is rotated by the driving force transmitted from the driving unit 47 (see FIG. 4). The conveying roller pair 36 is rotated while nipping the sheet S extending in the conveying orientation 8A from the tensioner 45, and thus the sheet S is fed in the conveying orientation 8A along the conveying surface 43A. The conveying roller pair 40 is rotated while nipping the sheet S fed from the conveying roller pair 36, and thus the sheet is fed in the conveying orientation 8A. Further, in accordance with the rotation of the conveying roller pairs 36, 40, the sheet S passes through the gap 42 from the sheet accommodating space 32C, and the sheet S is pulled out toward the tensioner 45.

As depicted in FIG. 1B, the conveying passage 43, which extends from the upper end of the outer circumferential surface 45A to arrive at the discharge port 33, is formed in the internal space 32A. The conveying passage 43 is the space which extends substantially linearly in the conveying orientation 8A, and the sheet S can pass through the space. In particular, the conveying passage 43 extends along the conveying surface 43A which expands in the conveying orientation 8A and in the left-right direction 9 and which is long in the conveying orientation 8A. Note that in FIG. 1B, the conveying surface 43A is depicted by a two-dot chain line which indicates the conveying passage 43. The conveying passage 43 is defined, for example, by the guide unit 50, the recording head 38, the conveying belt 37, and the fixing unit 39. That is, the guide unit 50, the recording head 38, the conveying belt 37, and the fixing unit 39 are positioned along the conveying passage 43.

<Guide Unit 50>

As depicted in FIGS. 1A and 1B, the guide unit 50 is positioned between the conveying roller pair 36 and the recording head 38 and the conveying belt 37 in the conveying orientation 8A. The guide unit 50 has an upper guide member 501 and a lower guide member 502 (shown in FIG. 2 as well). The lower surface of the upper guide member 501 and the upper surface of the lower guide member 502 are positioned slightly upwardly and downwardly respectively as compared with the conveying passage 43 in the upward-downward direction 7, and they are separated from each other in the upward-downward direction 7. The lower surface of the upper guide member 501 and the upper surface of the lower guide member 502 are larger than the width of the sheet S in the left-right direction 9 respectively, and they have the shapes of left-to-right symmetry with respect to the passing paper center C. The lower surface of the upper guide member 501 and the upper surface of the lower guide member 502 guide, to the conveying belt 37, the sheet S fed from the conveying roller pair 36. The sheet S is reliably guided by the guide unit 50 from the conveying roller pair 36 to the conveying belt 37. Note that the guide unit 50 is depicted in only FIGS. 1A and 1B and FIG. 2, and the guide unit 50 is omitted in FIG. 3A and the followings.

<Recording Head 38>

The recording head 38 (an example of the recorder) is positioned on the just downstream side from the conveying roller pair 36 over or above the conveying passage 43. The recording head 38 is provided with a discharge module 38A. The discharge module 38A has a plurality of nozzles 38B which are arranged while being aligned in one array in the left-right direction 9. Ink droplets are discharged downwardly from the plurality of nozzles 38B toward the sheet S conveyed by the conveying belt 37. Accordingly, the image is recorded on the sheet S supported by the conveying belt 37 and the support unit 46. Note that in FIGS. 1A and 1B, only one nozzle 38B is depicted. Alternatively, the nozzles 38B, which are disposed in two or more arrays separated in the front-back direction 8, may be aligned.

The tank 34 stores an ink. The ink is a liquid containing a pigment or the like. The ink has a viscosity which is appropriate to uniformly disperse the pigment. The pigment forms the color of the ink. Although not depicted in the drawing, the ink is supplied from the tank 34 via a tube to the recording head 38.

<Conveying Belt 37>

The conveying belt 37, a driving roller 37A, and a following roller 37B are positioned under or below the recording head 38. The driving roller 37A and the following roller 37B are separated from each other in the front-back direction 8. The conveying belt 37 is an endless belt, which has no through-hole unlike the suction belt. The conveying belt 37 is applied and stretched under tension between the driving roller 37A and the following roller 37B. Accordingly, the space 37D is comparted or defined by the inner circumferential surface of the conveying belt 37, the outer circumferential surface of the driving roller 37A, and the outer circumferential surface of the following roller 37B. The driving roller 37A is rotated by the driving force given by the driving unit 47 (see FIG. 4) including a motor, and the driving roller 37A rotates the conveying belt 37. The following roller 37B is rotated in accordance with the rotation of the conveying belt 37. The conveying belt 37 has the conveying surface 37C. The conveying surface 37C is the upper end portion of the outer circumferential surface of the conveying belt 37, and the conveying surface 37C extends in the conveying orientation 8A. The conveying surface 37C is opposed to the nozzles 38B of the recording head 38 with the conveying passage 43 intervening therebetween. The coefficient of friction of the conveying surface 37C is larger than the coefficients of friction of the extending ends (i.e., the upper ends) of the back wall 52L and the respective left walls 53L and the back wall 52R and the respective right walls 53R. The driving roller 37A is rotated so that the conveying surface 37C is moved in the conveying orientation 8A. Further, the conveying surface 37C gives the conveying force to the sheet S while supporting, from the lower position, the sheet S conveyed between the conveying roller pairs 36, 40. Accordingly, the sheet S, which is positioned on the conveying passage 43, is conveyed by the conveying belt 37 in the conveying orientation 8A along with the conveying surface 37C.

As depicted in FIG. 2, the outer circumferential surface of the conveying belt 37 including the conveying surface 37C is smaller than the minimum sheet width A1 in the left-right direction 9, and has the mutually symmetrical shape with respect to the passing paper center C. Further, as depicted in FIG. 1B, the conveying surface 37C is disposed at approximately the same vertical position as that of the nip D in the upward-downward direction 7.

<Support Unit 46>

As shown in FIG. 2, the support unit 46 includes a left support unit 46L and a right support unit 46R. Each of the left support unit 46L and the right support unit 46R is produced by integrally molding a material such as a resin or the like. The left support unit 46L and the right support unit 46R are positioned respectively on the leftward and the rightward from the conveying belt 37, and the left support unit 46L and the right support unit 46R are aligned with the conveying belt 37. The leftward and the rightward are examples of the orthogonal direction which is parallel to the conveying surface 37C and which is orthogonal to the conveying orientation 8A.

Figure 3A:
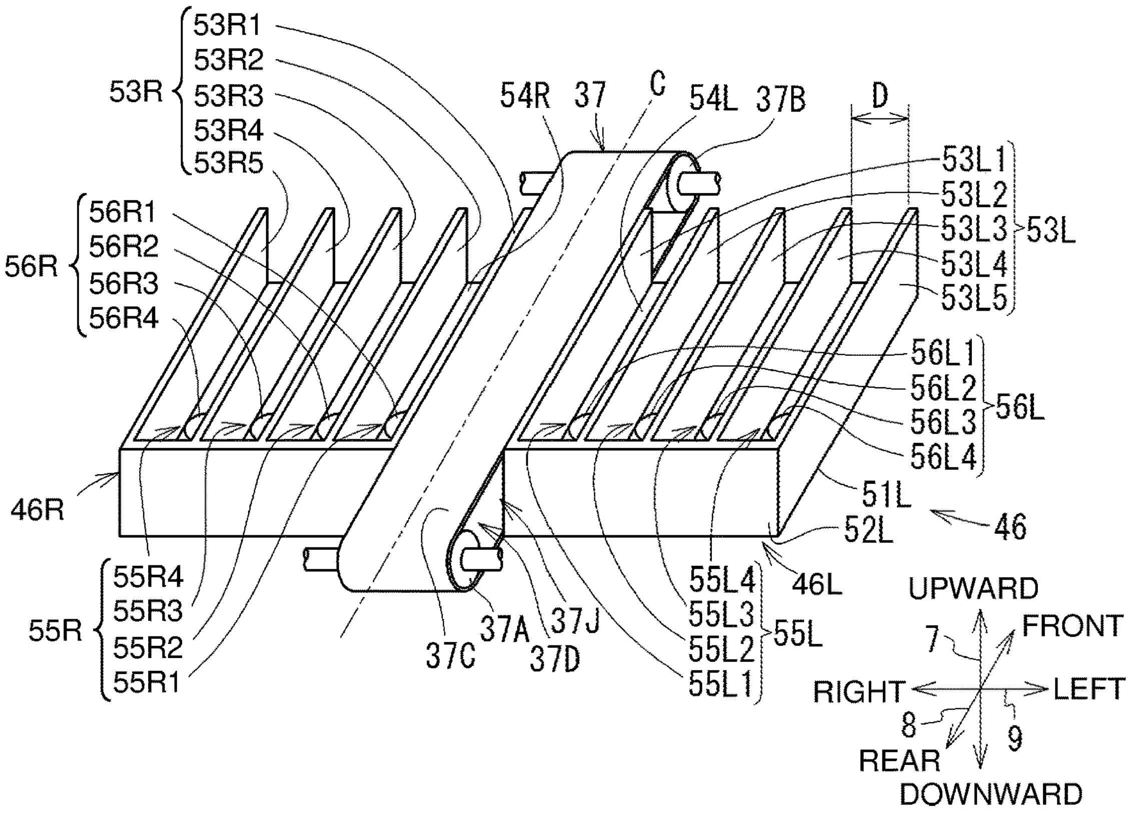
FIG. 3A depicts a perspective view illustrating the configuration of a support unit 46 according to an embodiment.

As depicted in FIG. 3A, the left support unit 46L has a bottom portion 51L and a back wall 52L. The left support unit 46L further has five left walls 53L, i.e., left walls 53L1 to 53L5.

The bottom portion 51L has a rectangular upper surface 54L. The upper surface 54L is adjacent to the conveying surface 37C at the left of the conveying surface 37C as viewed in a plan view from an upper position. The upper surface 54L expands in the front-back direction 8 and the left-right direction 9 at the position (height) lower than the position (height) of the conveying surface 37C. The both front and back ends of the upper surface 54L extend in the left-right direction 9 at the positions separated from each other in the front-back direction 8. The front end of the upper surface 54L is positioned while being separated backwardly from the following roller 37B, and the back end of the upper surface 54L is positioned while being separated frontwardly from the driving roller 37A (see FIG. 2).

The back wall 52L has a plate-shaped form which expands in the upward-downward direction 7 and the left-right direction 9 and which is thin in the front-back direction 8. The back wall 52L extends upwardly from the entire region of the back end of the upper surface 54L. The extending end of the back wall 52L has substantially the same vertical position as that of the conveying surface 37C over the entire region.

Each of the left walls 53L has a plate-shaped form which expands in the upward-downward direction 7 and the front-back direction 8 and which is thin in the left-right direction 9. The respective left walls 53L extend upwardly from the positions on the upper surface 54L which are different from each other in the left-right direction 9. The extending end of each of the left walls 53L has substantially the same vertical position as that of the conveying surface 37C over the entire region. Each of the left walls 53L extends from the front end of the upper surface 54L along the front-back direction 8 (conveying direction, i.e., the conveying orientation 8A and the orientation opposite to the conveying orientation 8A), and each of the left walls 53L arrives at the back wall 52L.

The left wall 53L1 is positioned along the right end of the upper surface 54L, and the left wall 53L1 closes the greater part of the left opening 373 of the space 37D. That is, the left wall 53L1 is the partition wall which partitions the space 37D. Note that the vertical position of the extending end of the left wall 53L1 is not limited to the above, which may be disposed slightly downwardly from the conveying surface 37C. Further, the left wall 53L1 may close the entire region of the opening 37J. Further, the left wall 53L1 may be positioned while being slightly separated leftwardly from the conveying belt 37.

The left walls 53L2 to 53L5 is positioned while being separated by a predetermined distance D leftwardly from each of the left walls 53L1 to 53L4, respectively. The left wall 53L5 is positioned along the left end of the upper surface 54L.

In particular, as depicted in FIG. 2, the left side surface of the left wall 53L3 is separated leftwardly from the passing paper center C by a distance which is a half of the minimum sheet width A1. As depicted in FIG. 2, the left side surface of the left wall 53L5 is separated leftwardly from the passing paper center C by a distance which is a half of the maximum sheet width A2. However, the present disclosure is not limited thereto. The left side surface of the left wall 53L3 may be separated leftwardly from the passing paper center C by a distance which is slightly smaller than the half of the minimum sheet width A1. Further, the left side surface of the left wall 53L5 may be separated leftwardly from the passing paper center C by a distance which is slightly smaller than the half of the maximum sheet width A2. Accordingly, during the period in which the conveying belt 37 conveys the sheet S having the minimum sheet width A1, the left walls 53L1 to 53L3 support the portion left of center of the sheet S being conveyed, from the back surface side of the sheet S. During the period in which the conveying belt 37 conveys the sheet S having the maximum sheet width A2, the left walls 53L1 to 53L5 support the portion left of center of the sheet S being conveyed, from the back surface side of the sheet S which is conveyed by the conveying belt 37 and which has the maximum sheet width A2.

Further, according to the configuration described above, the two left walls 53L, which are adjacent to one another in the left-right direction 9, are examples of the pair of support walls. The two left walls 53L surround the space together with the upper surface 54L and the back wall 52L to form four air flow passages 55L. As for each of the flow passages 55L in a state in which the conveying belt 37 does not convey the sheet S, the front end and the upper end of the flow passage 55L are open toward the frontward and the upward respectively. That is, each of the flow passages 55L is open in the direction in which the conveying surface 37C faces or is directed.

Further, the bottom portion 51L has air discharge ports 56L which are disposed at positions near to the back ends of the respective flow passages 55L and which are open toward the upward.

Note that in the following description, the four flow passages 55L are also referred to as "flow passages 55L1, 55L2, 55L3, 55L4" in an order starting from those disposed nearer to the conveying belt 37. The four air discharge ports 56L are also referred to as "air discharge ports 56L1, 56L2, 56L3, 56L4" in an order starting from those disposed nearer to the conveying belt 37.

The right support unit 46R has a bottom portion 51R and a back wall 52R. The right support unit 46R further has five right walls 53R. i.e., right walls 53R1 to 53R5. The bottom portion 51R, the back wall 52R, and the five right walls 53R have symmetrical shapes respectively in relation to the passing paper center C with respect to the bottom portion 51L, the back wall 52L, and the five left walls 53L. Therefore, any detailed explanation is avoided for the bottom portion 51R, the back wall 52R, and the right walls 53R. Further, the four flow passages 55R, i.e., the flow passages 55R1, 55R2, 55R3, 55R4 are formed by the bottom portion 51R, the back wall 52R, and the right walls 53R. Further, the bottom portion 51R has four air discharge ports 56R, i.e., air discharge ports 56R1 to 56R4 which are open toward the upward and which are disposed at the positions near to the back ends of the respective flow passages 55R.

Figure 4:
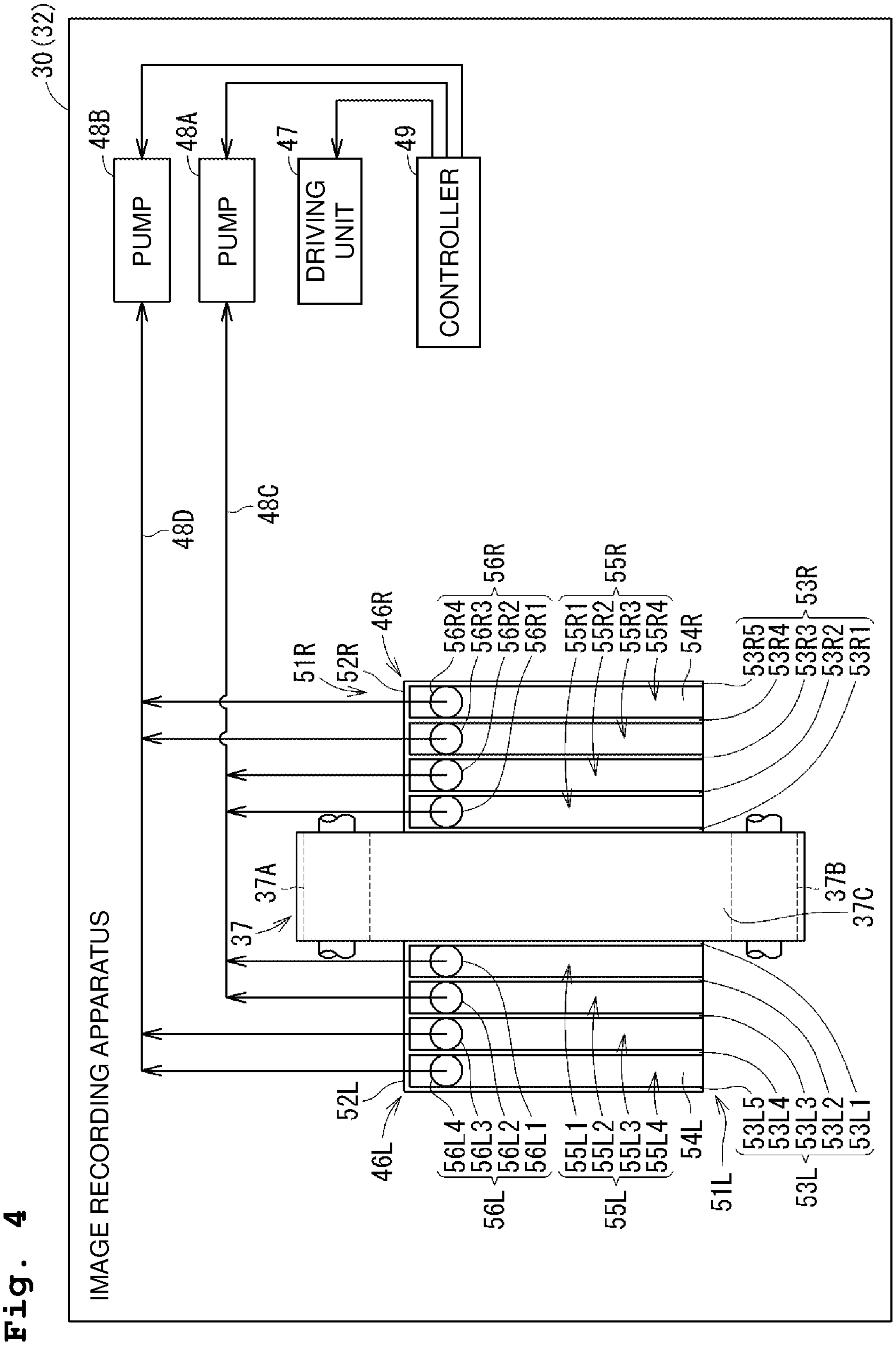
FIG. 4 depicts a block diagram illustrating the image recording apparatus 30.

As depicted in FIG. 4, the image recording apparatus 30 has a driving unit 47, two pumps 48A, 48B, and a controller 49 in the casing 32. Note that only the principal components of the configuration depicted in FIGS. 1A and 1B are depicted in FIG. 4.

The driving unit 47 includes, for example, a motor and gears. The driving unit 47 generates the driving force in order to rotate the driving roller 37A under the control of the controller 49. Note that the driving force may be transmitted to the conveying rollers 36A, 40A by a driving force transmitting unit including gears and the like.

The pump 48A is connected to the air discharge ports 56R1, 56R2, 56L1, 56L2 via a piping 48C so that the fluid communication can be performed. The pump 48A sucks the air from the insides of the flow passages 55L1, 55L2, 55R1, 55R2 (hereinafter referred to as "inner flow passages" as well) under the control of the controller 49. Accordingly, the air flow, which flows in the orientation opposite to the conveying orientation 8A, is generated in each of the inner flow passages.

The pump 48B is connected to the air discharge ports 56R3, 56R4, 56L3, 56L4 via a piping 48D so that the fluid communication can be performed. The pump 48B sucks the air from the insides of the flow passages 55L3, 55L4, 55R3, 55R4 (hereinafter referred to as "outer flow passages" as well) under the control of the controller 49. Accordingly, the air flow, which flows in the orientation opposite to the conveying orientation 8A, is generated in each of the outer flow passages.

The controller 49 is provided with CPU, ROM, RAM, EEPROM, and ASIC which are connected to one another by an internal bus or the like. The controller 49 controls the respective components of the configuration of the image recording apparatus 30.

<Operation of Image Recording Apparatus 30>

An operator installs the roll member 31 to the holder 35 as depicted in FIG. 2. After that, the sheet S is pulled out from the roll member 31, and the sheet S is applied to the outer circumferential surface 45A of the tensioner 45. After that, the operator allows the forward end of the sheet S to be nipped by the conveying roller pair 36. In this situation, the center of the sheet S in the widthwise direction is adjusted to the passing paper center C.

After that, the controller 49 acquires the information to indicate the sheet width A (hereinafter referred to as "sheet width information" as well) in the image recording apparatus 30. The roll member 31 is provided with a memory for previously storing the sheet width information in some cases. In such a situation, when the roll member 31 is installed to the holder 35, the controller 49 acquires the sheet width information from the memory of the roll member 31. The operator can also input the sheet width information by operating the operation panel 44. In this case, the controller 49 acquires the sheet width information from the operation panel 44.

If the sheet width information indicates the minimum sheet width A1, the controller 49 decides that the pump 48A is used when the sheet S is conveyed. On the contrary, if the sheet width information indicates the maximum sheet width A2, the controller 49 decides that both of the pumps 48A, 48B are used when the sheet S is conveyed.

The controller 49 outputs a predetermined driving signal to the driving unit 47 to drive the driving unit 47 irrelevant to the sheet width A of the sheet S. The driving unit 47 gives the driving forces to the driving roller 37A and the conveying rollers 36A, 40A, and thus the conveying roller pairs 36, 40 and the driving roller 37A are rotated. As a result, the sheet S is conveyed toward the discharge port 33 in the conveying orientation 8A along the conveying passage 43 from the conveying roller pair 36. In this process, the sheet S is conveyed by the conveying surface 37C which is moved in the conveying orientation 8A, while being supported by the conveying surface 37C of the conveying belt 37. The conveying surface 37C is smaller than the minimum sheet width A1 in the left-right direction 9. Therefore, the portion left of center of the sheet S abuts against the upper end of the left support unit 46L. The portion right of center of the sheet S abuts against the upper end of the right support unit 46R.

If the sheet width information indicates the minimum sheet width A1, the controller 49 outputs a control signal to the pump 48A to drive the pump 48A. Accordingly, the air flows, which flow in the orientation opposite to the conveying orientation 8A, are generated in the respective inner flow passages. When the air flows flow through the inner flow passages, the air pressures in the inner flow passages are lowered as compared with the air pressure provided over or above the sheet S. As a result, the portions left and right of center of the sheet S make tight contact with the extending ends of the left walls 53L1 to 53L3 and the right walls 53R1 to 53R3 respectively. However, the coefficients of friction of the respective extending ends are smaller than the coefficient of friction of the conveying surface 37C. Therefore, the sheet S slides in the conveying orientation 8A on the respective extending ends.

If the sheet width information indicates the maximum sheet width A2, the controller 49 outputs a control signal to the pumps 48A, 48B to drive the pumps 48A, 48B. Accordingly, the air flows, which flow in the orientation opposite to the conveying orientation 8A, are generated in the respective inner flow passages and the respective outer flow passages. Accordingly, the portions left and right of center of the sheet S make tight contact with the extending ends of the left walls 53L1 to 53L5 and the right walls 53R1 to 53R5 respectively. In this case, the sucking abilities of the pumps 48A, 48B are controlled by the controller 49 so that the flow rate(s) of the air in the inner flow passages is/are faster than the flow rate(s) of the air in the outer flow passages. Alternatively, the flow passage resistances of the inner flow passages and the outer flow passages are previously set so that the flow rate(s) of the air in the inner flow passages is/are faster than the flow rate(s) of the air in the outer flow passages.

Figure 3B:
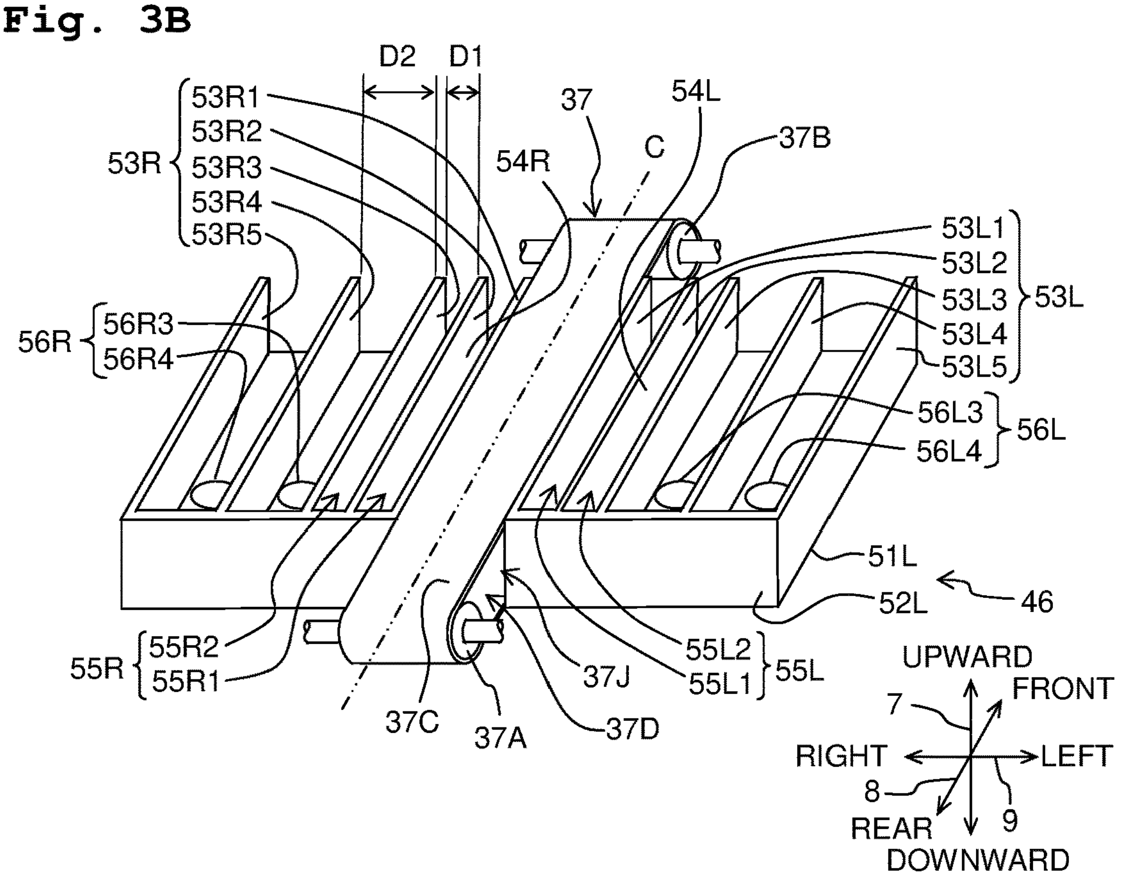
FIG. 3B depicts a perspective view illustrating the configuration of a support unit 46 according to another embodiment.

Specifically, as depicted in FIG. 3B, the left walls 53L2, 53L3 may be positioned while being separated leftwardly from the left walls 53L1, 53L2, respectively, by a first distance D1 (that is, the same distance to each other). The left walls 53L4, 53L5 may be positioned while being separated leftwardly from the left walls 53L3, 53L4, respectively, by a second distance D2 (that is, the same distance to each other). The first distance D1 may be smaller than the second distance D2. The same configuration can be applied to the right walls 53R2 to 53R5. In this case, even when the pumps 48A, 48B are driven to provide the mutually identical sucking ability, the flow rate of the air in the inner flow passages can be made faster than the flow rate of the air in the outer flow passages. Note that in FIG. 3B, the first distance D1 is indicated only between the right walls 53R2, 53R3, and the second distance D2 is indicated only between the right walls 53R3, 53R4.

<Function and Effect of Image Recording Apparatus 30>

According to the image recording apparatus 30, when the sheet S is conveyed in the conveying orientation 8A in accordance with the rotation of the conveying belt 37, the sheet S is sucked by the left support unit 46L and the right support unit 46R owing to the air flows allowed to flow through the respective flow passages 55L, 55R. Specifically, the sheet S is supported by the at least two right walls 53R adjacent to one another in the left-right direction 9 and the at least two left walls 53L adjacent to one another in the left-right direction 9. Accordingly, it is possible to decrease the contact area between the sheet S and the left support unit 46L and the contact area between the sheet S the right support unit 46R Therefore, the conveying belt 37 hardly slips with respect to the sheet S. On this account, the conveying surface 37C and the left support unit 46L and the right support unit 46R (more specifically, the upper ends of the left support unit 46L and the right support unit 46R) can be mutually disposed at the same vertical position (i.e., flush with each other). Accordingly, it is possible to provide the image recording apparatus 30 which can suppress the dispersion of the distance between the sheet S and the nozzles of the recording unit.

Further, the left support unit 46L and the right support unit 46R are positioned with the conveying belt 37 intervening therebetween. Further, when the sheet S is conveyed, the air flows, in which the flow rate distribution is in left-right symmetry (bilateral symmetry), are generated in the left support unit 46L and the right support unit 46R by means of only the pump 48A or both of the pumps 48A, 48B. Therefore, the sheet S hardly travels obliquely on the conveying surface 37C.

Further, the distance between the left side surface of the left wall 53L3 and the right side surface of the right wall 53R3 can be slightly smaller than the minimum sheet width A1. Further, the left wall 53L2 is positioned on the side nearer to the conveying belt 37 as compared with the left wall 53L3, and the right wall 53R2 is positioned on the side nearer to the conveying belt 37 as compared with the right wall 53R3. Accordingly, the support unit 46 can reliably support the sheet S having the minimum sheet width A1. Similarly, the distance between the left side surface of the left wall 53L5 and the right side surface of the right wall 53R5 is slightly smaller than the maximum sheet width A2. The left walls 53L2 to 53L4 and the right walls 53R2 to 53R4 are positioned on the sides nearer to the conveying belt 37 as compared with the left wall 53L5 and the right wall 53R5. Accordingly, the support unit 46 can reliably support the sheet S having the maximum sheet width A2.

Further, the left support unit 46L has the plurality of left walls 53L which are aligned in parallel in the left-right direction 9, and the right support unit 46R has the plurality of right walls 53R which are aligned in parallel in the left-right direction 9. Therefore, the support unit 46 can stably support a plurality of types of the sheets S having different sheet widths A. Further, a plurality of types of the sheets S can stably make tight contact with the upper ends of the left support unit 46L and the right support unit 46R.

Further, the respective left walls 53L2 to 53L4 compart the two flow passages 55L which mutually adjoin in the left-right direction 9, and the respective right walls 53R2 to 53R4 compart the two flow passages 55R which mutually adjoin in the left-right direction 9. Accordingly, a plurality of types of the sheets S can stably make tight contact with the upper ends of the left support unit 46L and the right support unit 46R as well.

Further, for example, when the sheet S having the maximum sheet width A2 is conveyed, the flow rate of the air in the inner flow passage is faster than the flow rate of the air in the outer flow passage. As a result, the force to suck the sheet S is weaker at the portions farther from the conveying belt 37 as compared with the portions nearer to the conveying belt 37 in each of the left support unit 46L and the right support unit 46R. Therefore, the conveying force, which is applied to the sheet S by the conveying belt 37, is suppressed from being lost.

Further, each of the left wall 53L1 and the right wall 53R1 functions as the partition wall for partitioning the space 37D. Therefore, any air flow is hardly generated in the space 37D during the driving of the pumps 48A, 48B. Accordingly, the sheet S is stably conveyed by the conveying belt 37. Further, the suction force for sucking the sheet S is hardly lowered on the left wall 53L2 and the right wall 53R2.

Further, the upper ends of each of the left walls 53L and each of the right walls 53R are disposed at the same vertical position as that of the conveying surface 37C. Therefore, the sheet S easily abuts against the conveying surface 37C, and the conveying force, which is applied to the sheet S by the conveying belt 37, is suppressed from being lost.

Further, the coefficient of friction of the conveying surface 37C is larger than the coefficients of friction of the upper ends of each of the left walls 53L and each of the right walls 53R. Accordingly, the sheet S hardly slides on the conveying surface 37C. Therefore, the conveyance of the sheet S is stabilized.

Modified Embodiments

Next, first to fifth modified embodiments will be explained.

Figure 3C:
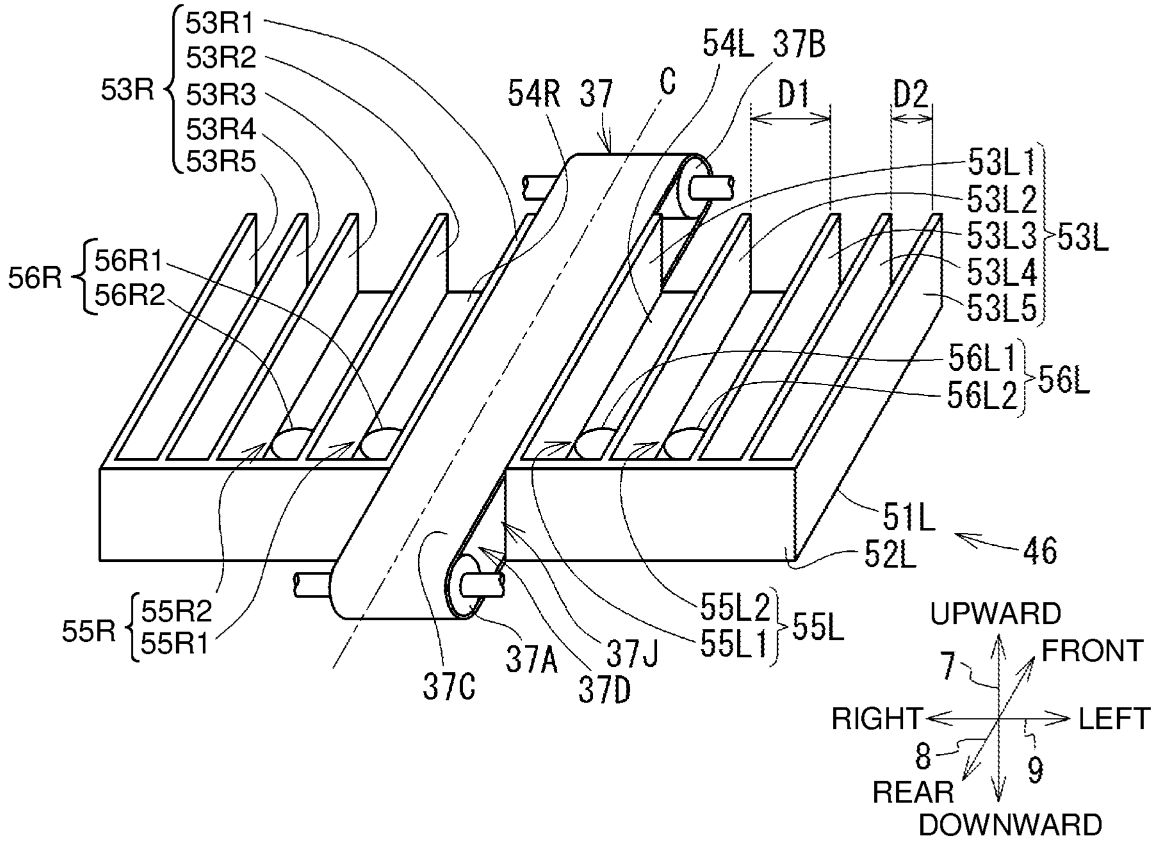
FIG. 3C depicts a perspective view illustrating the configuration of a support unit 46 according to a first modified embodiment.

In the embodiment, the left walls 53L2 to 53L5 are positioned while being separated leftwardly from the left walls 53L1 to 53L4, respectively, by the identical (constant) predetermined distance D. However, the present disclosure is not limited thereto. As in a first modified embodiment depicted in FIG. 3C, the left walls 53L2, 53L3 may be positioned while being separated leftwardly from the left walls 53L1, 53L2, respectively, by a first distance D1 (that is, the same distance to each other). The left walls 53L4, 53L5 may be positioned while being separated leftwardly from the left walls 53L3, 53L4, respectively, by a second distance D2 (that is, the same distance to each other). The first distance D1 is larger than the second distance D2. The same modification can be applied to the right walls 53R2 to 53R5. In this case, even when the pumps 48A, 48B are driven to provide the mutually identical sucking ability, the flow rate of the air in the outer flow passages can be made faster than the flow rate of the air in the inner flow passages. Note that in FIG. 3C, the first distance D1 is indicated only between the left walls 53L2, 53L3, and the second distance D2 is indicated only between the left walls 53L4, 53L5.

Figure 5A:
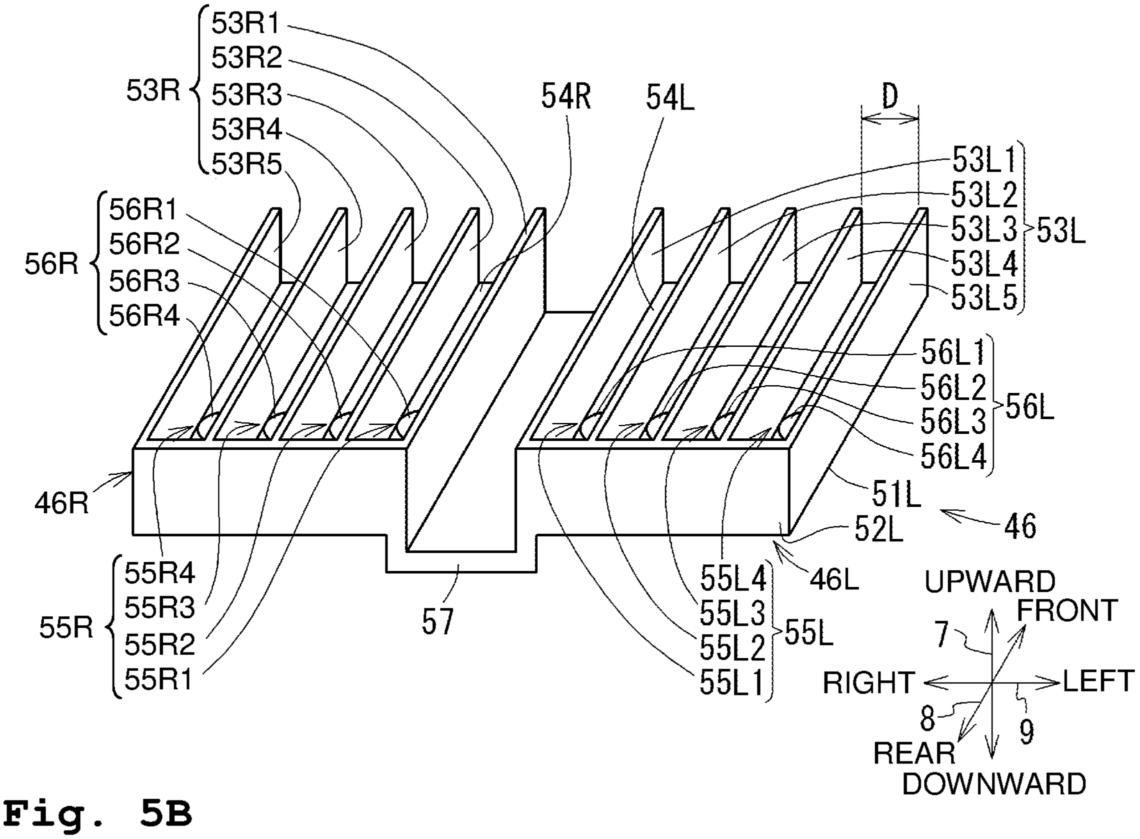
FIG. 5A schematically depicts a support unit 46 according to a second modified embodiment, and FIG. 5B schematically depicts partition walls 37L, 37R according to a third modified embodiment.

In a second modified embodiment depicted in FIG. 5A, the support unit 46 has a connecting portion 57 which mutually connects the left support unit 46L and the right support unit 46R at a position disposed under or below the conveying belt 37. The connecting portion 57 is produced by means of the integral molding with the same material as that of the left support unit 46L and the right support unit 46R. Accordingly, the left support unit 46L and the right support unit 46R are easily attached to the casing 32.

Figure 5B:
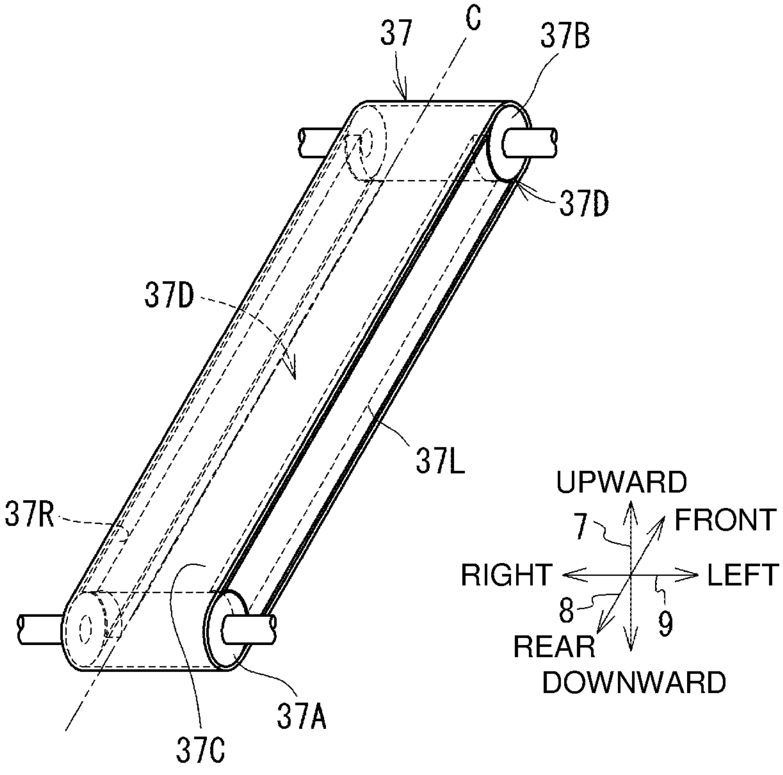

In a third modified embodiment depicted in FIG. 5B, partition walls 37L, 37R are positioned between the driving roller 37A and the following roller 37B. In particular, the partition wall 37L has a plate-shaped form which is long in the front-back direction 8 and which expands in the front-back direction 8 and the upward-downward direction 7 between the left end of the driving roller 37A and the left end of the following roller 37B. The partition wall 37L comparts the space 37D from the outside. The partition wall 37R has a shape which is symmetrical with respect to the partition wall 37L in relation to the passing paper center C. In this case, the left wall 53L1 and the right wall 53R1, which function as the partition walls, can be omitted.

Figure 6A:
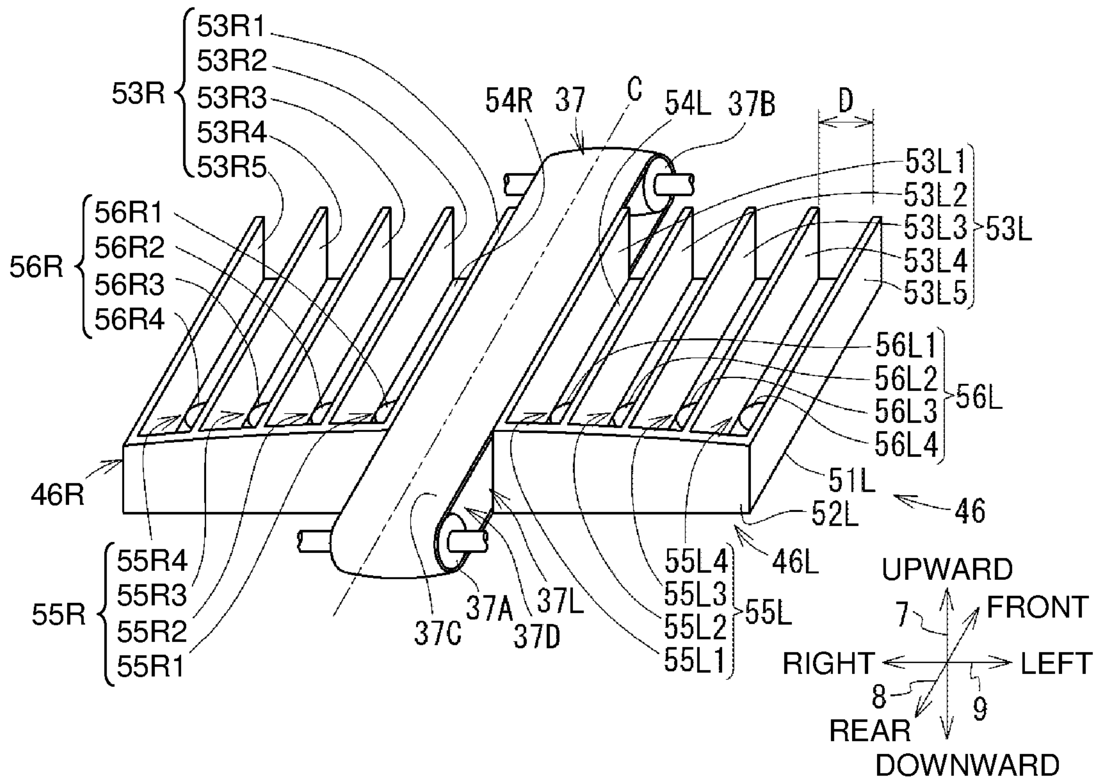
FIG. 6A schematically depicts a support unit 46 according to a fourth modified embodiment, and FIG. 6B schematically depicts a support unit 46A and conveying belts 37F, 37G according to a fifth modified embodiment.

Further, as in a fourth modified embodiment depicted in FIG. 6A, the conveying surface 37C may have a shape which slightly expands upwardly as viewed in a plan view in the front-back direction 8. In this case, extending ends of the left walls 53L1 to 53L5 and extending ends of the right walls 53R1 to 53R5 are positioned more downwardly at positions separated farther from the conveying belt 37. Accordingly, the sheet S easily abuts against the conveying surface 37C, the left walls 53L1 to 53L5, and the right walls 53R1 to 53R5.

Figure 6B:
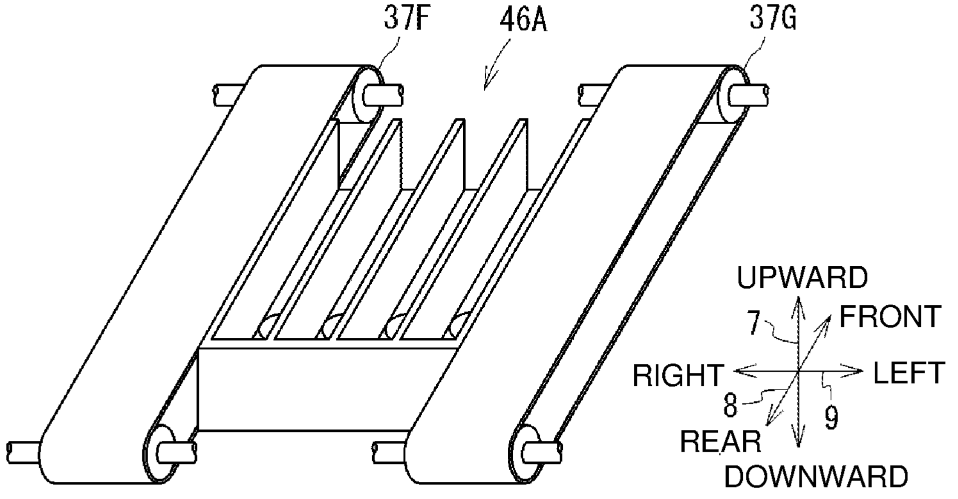

In the embodiment, the left support unit 46L and the right support unit 46R are positioned on the left side and the right side of one conveying belt 37. However, the present disclosure is not limited thereto. As in a fifth modified embodiment depicted in FIG. 6B, it is also allowable that a support unit 46A, which has the same or equivalent function as that of the support unit 46, is positioned between two conveying belts 37F, 37G.

Other Modified Embodiments

In the embodiment, the sheet S is conveyed by the conveying roller pair 36. However, the present disclosure is not limited thereto. The image recording apparatus 30 may convey the sheet S by means of any other conveying member such as a conveying belt or the like.

The tank 34 is not limited to the storage of one color ink of black. The tank 34 may store a plurality of color inks respectively. The plurality of colors are, for example, black, yellow, cyan, and magenta. Further, as for the ink, it is also allowable to use an ink containing a resin which is curable by ultraviolet light. In this case, the fixing unit 39 is an ultraviolet light radiating unit in place of the halogen heater.

The image recording apparatus 30 records the image on the sheet in accordance with the ink-jet system. However, in place thereof, it is also allowable to adopt a thermal head or adopt a printing system of the electrophotographic system. In this case, it is also allowable to omit the fixing unit 39 if the fixing unit 39 is not necessary.

It is not necessarily indispensable that the discharge port 33 is formed on the front surface 32F of the casing 32. For example, the discharge port 33 may be formed on the upper surface 32U of the casing 32, and the sheet S passing through the discharge port 33, on which the image has been recorded, may be discharged upwardly or obliquely upwardly.

Further, the image recording apparatus 30 is used in the state in which the front surface 32F and the back surface 32B of the casing 32 are disposed in the upward-downward direction and the left-right direction. However, the attitude or posture of the use of the image recording apparatus 30 is not limited thereto.

According to the present disclosure, the image recording apparatus is provided, which makes it possible to suppress the dispersion of the distance between the recording unit and the medium.

What is claimed is:

1. An image recording apparatus comprising:

an endless belt which extends in a conveying direction and which has a conveying surface configured to convey a medium in the conveying direction;

a driver configured to rotate the endless belt along the conveying direction;

a support including:

a first support which is aligned with the endless belt in an orthogonal direction being parallel to the conveying surface and orthogonal to the conveying direction, the first support having a first space which has a concave shape in a cross section orthogonal to the conveying direction and which extends in the conveying direction, the first space being opened in a normal line direction of the conveying surface; and a second support which is aligned with the endless belt in the orthogonal direction, the second support being disposed farther from the endless belt as compared with the first support in the orthogonal direction, the second support having a second space which has a concave shape in a cross section orthogonal to the conveying direction and which extends in the conveying direction, the second space being opened in the normal line direction of the conveying surface;

an air flow generator configured to generate a first air flow allowed to flow along the conveying direction in the first space and a second air flow allowed to flow along the conveying direction in the second space, where a flow rate of the first air flow is faster than a flow rate of the second air flow; and a recorder configured to record an image on the medium supported by the endless belt and the support.

2. The image recording apparatus according to claim 1, wherein the support includes a pair of supports which are positioned on both sides, in the orthogonal direction, of the endless belt respectively.

3. The image recording apparatus according to claim 2, wherein:

in each of the pair of supports, an outer support wall, is positioned separated from the endless belt in the orthogonal direction; and a distance between the outer support walls of the pair of supports is shorter than a length in the orthogonal direction of a minimum size capable of being subjected to the recording in the image recording apparatus.

4. The image recording apparatus according to claim 2, wherein each of the pair of supports includes the first support and the second support and in each of the pair of the supports, the flow rate of the first air flow is faster than the flow rate of the second air flow.

5. The image recording apparatus according to claim 1, further comprising a partition wall which is positioned between the endless belt and the support and which extends along the conveying direction, wherein the support is positioned below the recorder, and the conveying surface of the endless belt is disposed nearer to the recorder as compared with an upper end of the partition wall in the normal line direction of the conveying surface.

6. The image recording apparatus according to claim 5, wherein the partition wall is a support wall of the support.

7. The image recording apparatus according claim 1, wherein:

the support is opposed to the recorder and is positioned below the recorder, the first space of the first support is defined between a pair of first support walls extending in the conveying direction and the second space of the second support is defined between a pair of second support walls extending in the conveying direction; and positions of upper ends of the pair of first support walls and positions of upper ends of the pair of second support walls are identical to a position of the conveying surface in an opposing direction in which the pair of first support walls and the pair of second support walls oppose to the recorder.

8. The image recording apparatus according claim 1, wherein:

the first space of the first support is defined between a pair of first support walls extending in the conveying direction and the second space of the second support is defined between a pair of second support walls extending in the conveying direction; and a coefficient of friction of the conveying surface is larger than a coefficient of friction of forward ends of the pair of first support walls and the pair of second support walls facing the recorder.

9. The image recording apparatus according to claim 1, wherein the recorder has nozzle which is opposed to the conveying surface and which is configured to discharge a liquid toward the medium.

10. The image recording apparatus according to claim 1, wherein the air flow generator includes a first pump configured to suck an air in the first support to cause the first air flow and a second pump configured to suck an air in the second support to cause the second air flow, a sucking force of the first pump being larger than a sucking force of the second pump.

11. The image recording apparatus according to claim 1, wherein, a magnitude of sucking force to be applied to the first space is identical to a magnitude of sucking force to be applied to the second space; and an area of the cross section of the first space is smaller than an area of the cross section of the second space.

12. The image recording apparatus according to claim 11, wherein:

the first space of the first support is defined between a pair of first support walls extending in the conveying direction and the second space of the second support is defined between a pair of second support walls extending in the conveying direction;

a size, in the normal line direction of the conveying surface, of the pair of first support walls and a size, in the normal line direction, of the pair of second support walls are identical to each other; and a distance, in the orthogonal direction, between the pair of first support walls is smaller than a distance, in the orthogonal direction, between the pair of second support walls.

13. An image recording apparatus comprising:

an endless belt which extends in a conveying direction and which has a conveying surface configured to convey a medium in the conveying direction;

a driver configured to rotate the endless belt along the conveying direction;

a support including:

a first support which is aligned with the endless belt in an orthogonal direction being parallel to the conveying surface and orthogonal to the conveying direction, the first support having a first space which has a concave shape in a cross section orthogonal to the conveying direction and which extends in the conveying direction, the first space being opened in a normal line direction of the conveying surface; and a second support which is aligned with the endless belt in the orthogonal direction, the second support being disposed farther from the endless belt as compared with the first support in the orthogonal direction, the second support having a second space which has a concave shape in a cross section orthogonal to the conveying direction and which extends in the conveying direction, the second space being opened in the normal line direction of the conveying surface;

an air flow generator configured to generate a first air flow allowed to flow along the conveying direction in the first space and a second air flow allowed to flow along the conveying direction in the second space, a flow rate of the second air flow is faster than a flow rate of the first air flow; and a recorder configured to record an image on the medium supported by the endless belt and the support.

14. The image recording apparatus according to claim 13, wherein the air flow generator includes a first pump configured to suck an air in the first support to cause the first air flow and a second pump configured to suck an air in the second support to cause the second air flow, a sucking force of the second pump being larger than a sucking force of the first pump.

15. The image recording apparatus according to claim 13, wherein, a magnitude of sucking force to be applied to the first space is identical to a magnitude of sucking force to be applied to the second space; and an area of the cross section of the second space is smaller than an area of the cross section of the first space.

16. The image recording apparatus according to claim 15, wherein:

the first space of the first support is defined between a pair of first support walls extending in the conveying direction and the second space of the second support is defined between a pair of second support walls extending in the conveying direction;

a size, in the normal line direction of the conveying surface, of the pair of first support walls and a size, in the normal line direction, of the pair of second support walls are identical to each other; and a distance, in the orthogonal direction, between the pair of second support walls is smaller than a distance, in the orthogonal direction, between the pair of first support walls.

17. An image recording apparatus comprising:

an endless belt which extends in a conveying direction and which has a conveying surface configured to convey a medium in the conveying direction;

a driver configured to rotate the endless belt along the conveying direction;

a support which is aligned with the endless belt in an orthogonal direction being parallel to the conveying surface and orthogonal to the conveying direction, the support having a surface defining a space which has a concave shape in a cross section orthogonal to the conveying direction and which extends in the conveying direction, the space being opened in a normal line direction of the conveying surface, a first end, in the conveying direction, of the space being opened in the conveying direction, a second end of the space opposite to the first end, in the conveying direction, being closed in the conveying direction by a wall, the surface having a discharging port adjacent to the space, an air flow generator which is connected to the discharging port and which is configured to generate an air flow allowed to flow along the conveying direction in the space; and a recorder configured to record an image on the medium supported by the endless belt and the support.

18. The image recording apparatus according to claim 17, further comprising an additional support which is aligned with the endless belt in the orthogonal direction, the additional support being disposed farther from the endless belt as compared with the support in the orthogonal direction and being adjacent to the support, the additional support having a surface defining a space which has a concave shape in a cross section orthogonal to the conveying direction and which extends in the conveying direction, the space being opened in the normal line direction of the conveying surface, the surface having a discharging port adjacent to the space, the space of the support and the space of the additional support being separated from each other, wherein the air flow generator is connected to the discharging port of the additional support and is configured to generate an air flow allowed to flow along the conveying direction in the space of the additional support.

* * * * *